United States Patent [19]

Masaki et al.

[11] Patent Number: 5,239,490
[45] Date of Patent: Aug. 24, 1993

[54] DEVICE FOR DETECTING ROTATION OF ROTARY SHAFT AND ROTATION CONTROLLING APPARATUS USING THE SAME

[75] Inventors: Ryoso Masaki, Hitachi; Toshiyuki Koterazawa, Tsukuba; Kazuo Tahara; Kunio Miyashita, both of Hitachi; Yoshikazu Hoshi, Naka; Tadashi Takahashi, Hitachi; Shuichi Nakano, Katsuta, all of Japan

[73] Assignee: Hitachi, Ltd., Tokyo, Japan

[21] Appl. No.: 581,309

[22] Filed: Sep. 12, 1990

[30] Foreign Application Priority Data

Sep. 20, 1989 [JP] Japan .................................. 1-242067

[51] Int. Cl.$^5$ .................................................. G01B 7/30
[52] U.S. Cl. ........................... 364/565; 73/862.08; 180/79.1; 324/86; 324/163; 364/424.05; 364/556; 364/571.02
[58] Field of Search ............ 364/424.05, 556, 565, 364/571.01, 571.02, 571.05; 180/79.1, 140, 141, 142, 143; 73/862.08, 862.33, 862.44; 33/1 PT; 324/83 R, 86, 79 R, 167, 166, 163

[56] References Cited

U.S. PATENT DOCUMENTS

| | | | |
|---|---|---|---|
| 4,086,520 | 4/1978 | Hashizaki et al. | 318/269 |
| 4,254,469 | 3/1981 | Whitely | 364/571.05 |
| 4,318,617 | 3/1982 | Orsen | 364/571.02 X |
| 4,506,554 | 3/1985 | Blomkvist et al. | 73/862.36 |
| 4,556,886 | 12/1985 | Shimizu et al. | 340/870.32 |
| 4,587,485 | 5/1986 | Papiernik | 324/166 |
| 4,618,940 | 10/1986 | Schmitt | 364/571.01 X |
| 4,724,710 | 2/1988 | Murty | 73/862.33 |
| 4,774,464 | 9/1988 | Kubota et al. | 324/208 |
| 4,794,536 | 12/1988 | Eto et al. | 364/424.05 |
| 4,828,060 | 5/1989 | Drutchas et al. | 180/79.1 |
| 4,828,061 | 5/1989 | Kimbrough et al. | 180/79.1 |
| 4,862,044 | 8/1989 | Karashima et al. | 318/254 |
| 4,862,396 | 8/1989 | Nirumandrad | 364/571.02 |
| 4,869,334 | 9/1989 | Marumoto et al. | 180/79.1 |
| 4,874,053 | 10/1989 | Kimura et al. | 180/79.1 |

FOREIGN PATENT DOCUMENTS

| | | |
|---|---|---|
| 0047764B1 | 10/1984 | European Pat. Off. |
| 62-6130 | 1/1987 | Japan |
| 62-67401 | 3/1987 | Japan |
| 63-265127 | 11/1988 | Japan |
| 1-97826 | 4/1989 | Japan |

Primary Examiner—Thomas G. Black
Assistant Examiner—Collin W. Park
Attorney, Agent, or Firm—Antonelli, Terry, Stout & Kraus

[57] ABSTRACT

This specification discloses inventions of a rotation detecting device for a rotary shaft and of a rotation controlling apparatus using this rotation detecting device. The rotation detecting device according to the invention comprises a signal generator for generating two signals vary their amplitude in accordance with the rotation angle of the rotary shaft and have a predetermined phase difference therebetween, part for correcting the respective center voltages output from the signal generator, part for correcting a deviation from the phase deviation between the two signals, and part for correcting the rotating amounts of the rotary shaft on the basis of the corrected two signal. The rotating amounts are represented in terms of rotating angles. A rotating torque can be obtained by calculating a difference between the rotating angles measured at two points apart from each other on the rotary shaft. The rotary shaft can be controlled in accordance with the rotating angle or the rotating torque.

18 Claims, 11 Drawing Sheets

DEVICE FOR DETECTING ROTATION OF ROTARY SHAFT AND ROTATION CONTROLLING APPARATUS USING THE SAME

BACKGROUND OF THE INVENTION

The present invention relates to a device for detecting rotation of a rotary shaft, and more particularly to a device for detecting the rotating angle or rotating torque thereof, and also relates to a rotary shaft controlling apparatus such as an electric power steering apparatus using a rotating torque detecting device.

In order to control the rotation of the device provided with a rotary shaft, such as the steering shaft for an automobile and the rotating arm of a robot or a machine tool, it is necessary to detect the rotating angle or rotating torque of the rotary shaft.

The device for detecting the torque of a rotary shaft is disclosed in e.g. Japanese publication JP-A-1-97826 corresponding to the Japanese application filed by HITACHI, LTD. on Oct. 9, 1987. In the torque detecting device disclosed in this publication, the rotating torque is calculated using rotating angle sensors located at two points of a rotary shaft which are spaced from each other as follows. First, two magnetoresistance (MR) devices arranged in the neighborhood of a magnetic drum detect the magnetic field generated when the peripheral surface of the rotating drum coaxially connected with the rotary shaft is magnetized alternately with an N pole and an S pole. The rotating angle sensors detect the rotating angles of the rotary shaft from a sine signal and a cosine signal generated by the two MR devices, and further detect the difference in the rotating angles due to twists at two points of the shaft when the rotary shaft is rotated, thereby calculating the rotating torque. More specifically, as signals are generated the amplitudes of the signals change in the form of a sine wave and a cosine wave owing to a change in the rotating angle of the shaft; the value of the sine wave is divided by the value of the cosine wave to provide a tangent function $x = \tan \theta$, and the arc-tangent function $(\theta = \tan^{-1} x)$ of the tangent function is calculated to provide the rotating angle $\theta$.

U.S. Pat. No. 4,774,464 issued to Masanori Kubota on Sep. 27, 1988, discloses an example of a rotating sensor using a magnetic drum and an MR sensor attached to a rotary shaft. Such a rotating angle sensor using an MR device is excellent in endurance and reliability because it has no slidable portion (i.e. is of a non-contact type).

Examples of a rotating angle sensor and a rotating torque detecting device are also disclosed in JP-A-62-6130 filed by HITACHI, LTD. on Oct. 9, 1987, JP-A-62-67401 filed by KOBE SEIKO CO., LTD., JP-A-64-265127 filed by HITACHI, LTD. on Apr. 23, 1987, U.S. Pat. No. 4,724,710 issued to Murty on Feb. 16, 1988, and U.S. Pat. No. 4,506,554 issued to Blomkvist, et al on Mar. 26, 1985. Further, examples of the electric power steering device are disclosed in U.S. Pat. No. 4,828,060 issued to Drutchas, deceased et al on May 9, 1989, and U.S. Pat. No. 4,828,061 issued to Kimbrought et al on May 9, 1989.

Now it should be noted that the rotation sensor and the rotation torque sensor using the rotation sensor hitherto known have no means for obviating output error. The output error is due to a change in the offset voltage of an operational amplifier for amplifying a minor signal from a sensor device, a change in the signal amplitude, inequality in the magnetization amount on a magnetic drum, and a change in the relative position between the MR device and the magnetic drum. These causes of error lead to changes in the central voltage of the output waveform from the MR device and in the phase difference in the two output waveforms, which in turn lead to error in the rotating angle and rotating torque to be detected.

For example, in the case where a rotation sensor is used for an electric power steering device, the presence of a small torque ripple due to a torque detection error in an electric motor generating an auxiliary steering torque gives a driver a sense of unpleasantness and anxiety. To obviate this, it is necessary to provide a signal adjusting circuit for correcting the offset value or the amplitude value individually from the sensor. However, this makes the control circuit complicated and therefore the adjustment is troublesome.

SUMMARY OF THE INVENTION

An object of the present invention is to provide a rotation detecting device which can automatically correct changes in the central voltage or phase of a rotating angle detecting signal to produce a rotation detecting signal with no error.

Another object of the present invention is to provide a rotation controlling apparatus using a rotation detecting device with no error, e.g. an electric power steering apparatus.

The rotation controlling apparatus according to the present invention can be applied to a rotary shaft controlling apparatus for use in a robot, machine tool, etc. as well as an electric power steering apparatus. Further, in the rotation detecting device according to the present invention, error correction processing can be executed using a microcomputer.

In accordance with the present invention, the maximum values, minimum values or phase differences in wave signals such as sine or triangular signals for obtaining rotation angles are automatically detected using only their waveforms, and the rotation angles to be calculated from the plural wave signals are corrected using the detected values. Thus, an angle sensor or torque sensor with a high accuracy can be provided.

Further, in accordance with the present invention, a torque sensor providing plural wave signals with different phases in a non-contact manner is used to provide electric power steering for torque control using the torque signal from the torque sensor, and the rotation angle is automatically controlled only using the above wave signals. Thus, a torque control device with high accuracy is always provided with no need for adjustment.

Further, in accordance with the present invention, the maximum values, minimum values and phase differences in plural sine wave signals providing rotation angles are automatically detected on the basis of their waveforms, the center voltages and amplitude voltages of the respective sine wave signals are calculated using the detected values, and the rotation angles to be calculated from the plural sine waves are corrected using the center voltages, amplitude voltages and the phase differences. Such rotation angle detecting devices are provided on the same rotary shaft to calculate differences in the rotation angles, thereby detecting torque with high accuracy.

Now, it should be noted that the maximum value and minimum value of a sine signal can be detected as follows. In the case where two phase signals consisting of a sine signal and a cosine signal are used, the central voltage of the sine signals and the cosine signals, which are obtained in the subsequent step, are taken as tentative center voltages, respectively. If one signal has the value of its center voltage, the other signal is detected as its maximum value or minimum value. The center voltage is corrected using the detected value. Next, the maximum value or minimum value is corrected using the corrected center voltage in the same manner. Thus, the sine wave signal can be converged into a real maximum and a real minimum value.

Further, only when it is decided that the rotary shaft is rotating in a certain direction from the rotation angle to be obtained in the subsequent step, data of the sine wave during its one cycle period can be compared thereby to calculate the maximum value and the minimum value of the sine wave signal. If they are to be detected by a digital control device, the digital control device is constituted so that the maximum value or minimum value of the sine wave signal will not be detected when the rotation angular speed exceeds a predetermined value, thereby preventing the detection accuracy from being reduced.

In the case where two phase signals consisting of a sine wave signal and a cosine wave signal are used, the phase difference can be detected by comparing the amplitudes of these signals when the difference between the sine wave signal and its central signal is equal to that between the cosine wave signal and its central signal with their amplitudes when the difference between the sine signal and its central signal is equal to that between the cosine signal, and its central signal and the cosine signal. This is because the absolute values of both signals are equal when the phase difference is 90 degree, but become different as the phase difference changes from 90 degree. Thus, the phase difference can be detected so that the rotation angle error due to the phase deviation can be compensated for, thereby providing a torque sensor with a high accuracy.

In the electric power steering apparatus using the above non-contact torque sensor, in spite of the magnitude of torque given to a steering shaft and the sine wave signal which is likely to change owing to sensors change, the central voltages, amplitude voltages and phase differences can be always automatically detected. Therefore, without using a complicated signal adjusting circuit and so with no adjustment, the torque can be detected with high accuracy. Thus, an electric power steering apparatus with good steering feeling can be provided with a low cost.

Incidentally, it should be noted that a sine wave and all the waves having different phases from that of the sine wave are generally referred to as wave signals. These wave signals include wave signals having an amplitude which cyclically changes in accordance with the rotation angle and includes the sine wave signal and the cosine wave signal.

DESCRIPTION OF THE PREFERRED EMBODIMENTS

Now referring to FIGS. 1 to 4, one embodiment of the present invention will be explained below.

Figure 1:
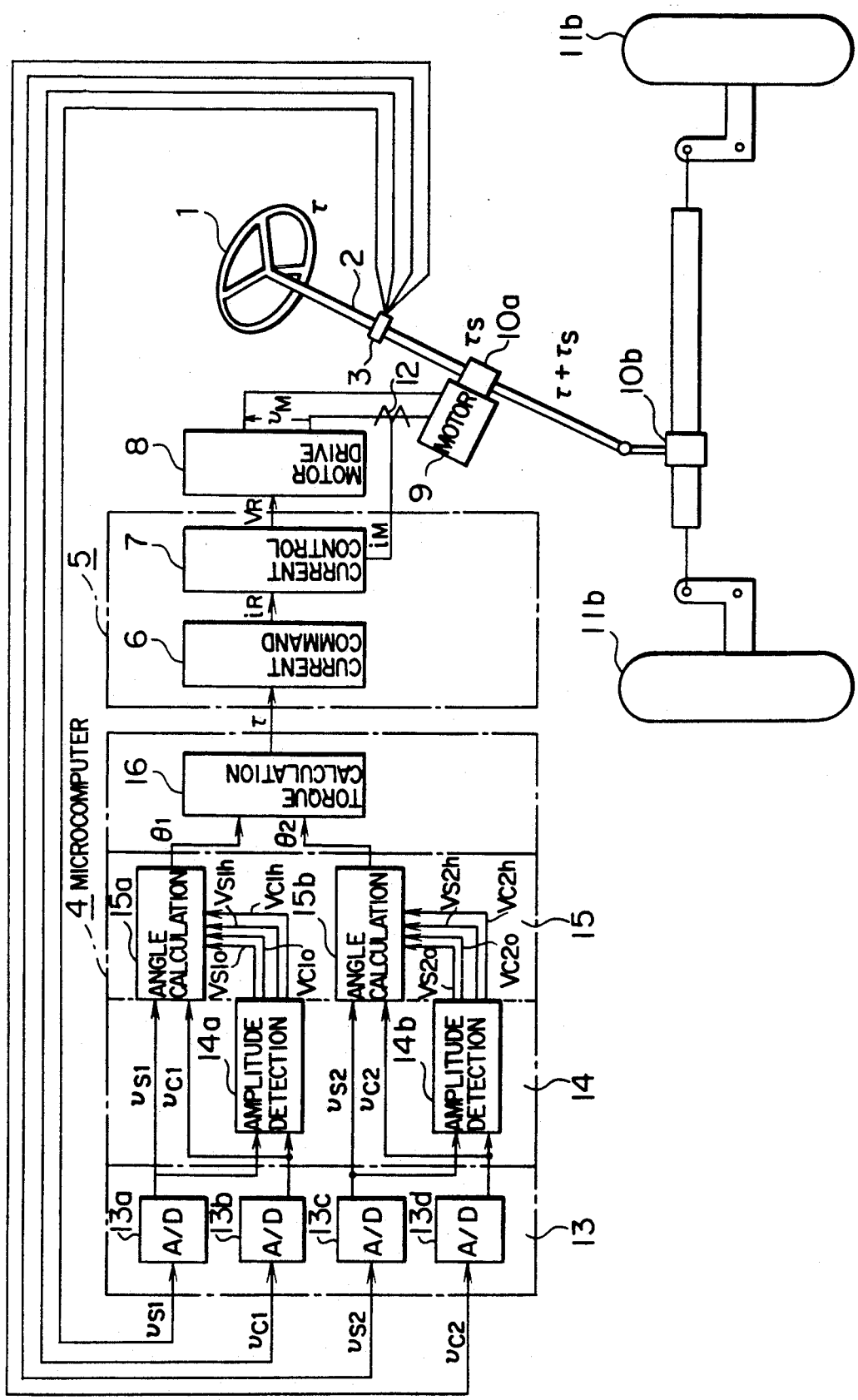
FIG. 1 is a view showing the arrangement of one embodiment of the rotation angle/torque detecting device according to the present invention which is applied to an automobile electric power steering apparatus.

FIG. 1 shows one embodiment of a rotation angle/rotation torque detecting device according to the present invention which is applied to an automobile electric power steering apparatus.

In operation, when a driver steers a steering wheel 1, an angular signal generator 3 attached to a steering shaft 2 generates four sine wave signals Vs1, Vc1, Vs2 and Vc2 corresponding to rotating angles (electric angles) of the steering shaft 2 at the position where the angular signal generator 3 is attached (this will be described in detail later). These signals are supplied to a torque calculating device 4 which serves to calculate the steering torque $\tau$ of the steering shaft 2. The steering torque $\tau$ is sent to a torque controlling device 5. The torque controlling device 5 consists of a current command circuit 6 which serves to calculate a current command iR for generating an optimum supplementary torque $\tau s$ to be added to the steering torque $\tau$, and a current controlling circuit 7 which serves to calculate an applying voltage command vR using the current command iR and a motor current iM. In response to the applying voltage command vR, a driving circuit 8 generates a voltage vM to be applied to a motor 9 (The current command circuit 6, the current controlling circuit 7 and the driving circuit 8 can be realized on the basis of the well known motor control technique). Thus, the motor 9, through power transmission members 10a and 10b, generates the supplementary torque $\tau s$ for steering tires 11a and 11b. Additionally, a current detector 12 serves to detect the motor current iM to be sent to the current controlling circuit 7, thereby executing current feedback control. A series of operations described above permits wheels 11a and 12a to be freely steered when the driver rotates the steering wheel 1 by only a small steering force.

Now explanation will be given for the operation of the torque calculating device 4. The four sine wave signals Vs1, Vc1, Vs2 and Vc2 provided by the angular signal generator 3 are used to detect the rotation angles (twists) at two different positions of the steering shaft 2; the detail of the structure therefor will be described later. Vs1 and Vc1 are used to provide the rotation angle $\theta 1$ at a point on the steering wheel side (driving side), whereas Vs2 and Vc2 are used to provide the rotation angle $\theta 2$ at a point on the motor side (side to be driven). These signals can be basically expressed by $$Vs1 = Vs1h \sin \theta 1 + Vs10 \quad (1)$$

$$Vc1 = Vc1h \sin \theta 1 + Vc10 \quad (2)$$

$$Vs2 = Vs2h \sin \theta 2 + Vs20 \quad (3)$$

$$Vc2 = Vc2h \sin \theta 2 + Vc20 \quad (4)$$

where Vs10, Vc10, Vs20 and Vc20 are the central voltages of the corresponding signals and Vs1h, Vc1h, Vs2h and Vc2h are amplitude voltages thereof.

First, Vs1, Vc1, Vs2 and Vc2 are supplied to A/D converters 13a, 13b, 13c and 13d in the torque calculating device 4, respectively. Vs1 and Vc1 are supplied to both signal center/amplitude detecting circuit 14a and angle calculating circuit 15a. The signal center/amplitude detecting circuit 14a calculates the central voltages Vs10, Vc10 and the amplitude voltages Vs1h, Vc1h. These results are sent to the angle calculating circuit 15a. The angle calculating circuit 15a calculates $$s1 = (Vs1 - Vs10)/(Vs1h = \sin \theta 1 \quad (5)$$

$$c1 = (Vc1 - Vc10)/Vc1h = \cos \theta 1 \quad (6)$$

By calculating $$\theta 1 = \tan^{-1}(s1/c1) \quad (7)$$

$\theta 1$ on the steering wheel side can be obtained.

Likewise, using Vs1, Vc1, the central voltages Vs20, Vc20 and the amplitude voltages Vs2h, Vc2h calculated by the signal center/amplitude detecting circuit 14b, an angle calculating circuit 15b calculates $\theta 2$ on the motor side from the equations:

$$s2 = (Vs2 - Vs20)/Vs2h = \sin \theta 2 \quad (8)$$

$$c2 = (Vc2 - Vc20)/Vc2h = \cos \theta 2 \quad (9)$$

$$\theta 2 = \tan^{-1}(s2/c2) \quad (10)$$

A torque calculating circuit 16 calculates a steering torque $\tau$ using a difference between $\theta 1$ on the steering wheel side and $\theta 2$ on the motor side on the basis that the difference due to twist of the steering shaft 2 is proportional to the steering torque $\tau$.

Figure 2:
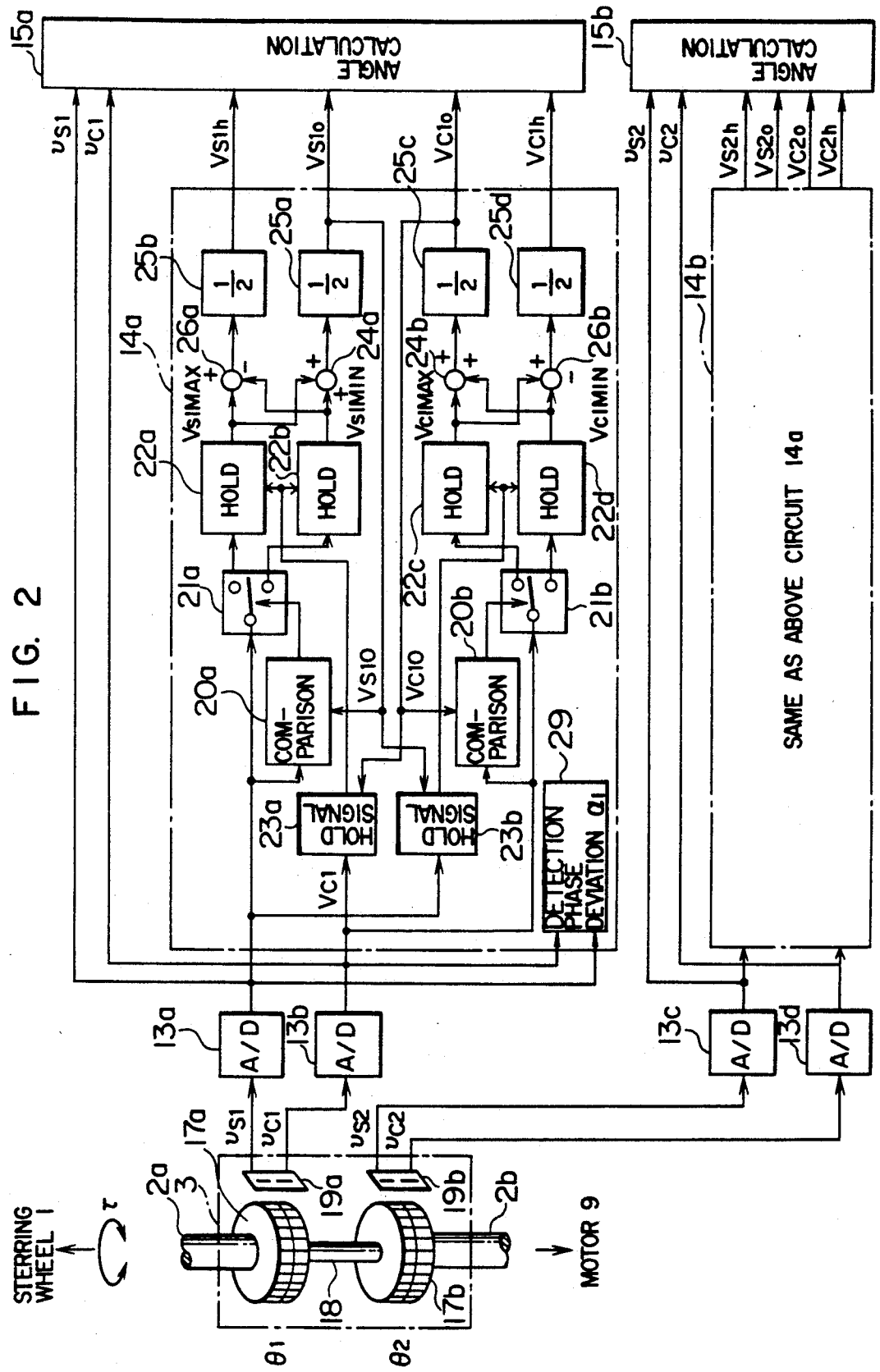
FIG. 2 is a block diagram showing the detailed arrangement of the angular signal generating circuit, torque signal generating circuit and center/amplitude detecting circuit as shown in FIG. 1.

With reference to FIG. 2, explanation will be given for the angle signal generating circuit 3 and the signal center/amplitude detecting circuit 14 which is a main feature of this embodiment.

In order to improve reliability of the electric power steering apparatus, the angle signal generator 3 uses a non-contact magnetic sensor. Magnetic drums 17a and 17b bearing magnetic elements corresponding to the steering wheel side circumferencial angle $\theta 1$ and the motor side circumferencial angle $\theta 2$ are arranged around the steering shaft 2a on the steering wheel and the steering shaft 2b on the motor side, respectively. Also, the drums 17a and 17b are attached at respective ends of a torsion bar 18. The torsion bar 18 is adapted to be twisted in accordance with the steering torque $\tau$. A magnetoresistance element 19a detects the magnetic signals from the magnetic drum 17a in a non-contact manner and produces the sine wave signals Vs1 and Vc1 corresponding to the steering wheel side angle $\theta 1$. Likewise, a magnetoresistance element 19b detects the magnetic signals from the magnetic drum 17b in a non-contact manner and produces the sine wave signals Vs2 and Vc2 corresponding to the motor side angle $\theta 2$. In this way, the torque detecting device for the non-contact type electric power steering apparatus can be obtained.

Now, explanation will be given for calculating the center voltages Vs10, Vc10 and the amplitude voltages Vs1h, Vc1h from the sine wave signals Vs1, Vc1. First, the center/amplitude detecting circuit 14a receives the sine signals Vs1 and Vc1 obtained through the A/D converters 13a and 13b, respectively. A comparator 20a compares Vs1 with the center voltage Vs10 thereof which will be obtained in the manner described later (initial calculation, Vs10 is set for a predetermined initial value) to generate a signal so that if $Vs1 > Vs10$, a switch circuit 21a is connected with a hold circuit 22a, and if $Vs1 < Vs10$, it is connected with a hold circuit 22b. On the other hand, when Vc1 becomes substantially equal to Vc10, i.e.

$$Vc10 - \Delta V \leq Vc1 \leq Vc10 + \Delta V \quad (11)$$

($\Delta V$: an identifying voltage), a hold signal generating circuit 23a generates a signal so that the hold circuit 22a and 22b are switched into a hold state. Then, if $Vs1 > Vs10$, Vs1 at this time, which can be regarded as the maximum value Vs1max thereof, is held in the hold circuit 22a. If $Vs1 < Vs10$, Vs1 at this time, which can be regarded as the minimum value Vs1min thereof, is held in the hold circuit 22b. Additionally, the hold circuit designated by the switch circuit 21a is adapted to hold the previous value. In this way, the maximum value Vs1max and the minimum value Vs1min can be obtained. Using an adder 24a and an amplifier 25a, the center voltage Vs10 of Vs1 can be calculated by $$Vs10 = (Vs1max + Vs1min)/2 \quad (12)$$

The amplitude voltage Vs1h of Vs1 can be calculated, using a subtractor 26a and an amplifier 25b, by $$Vs1h = (Vs1max - Vs1min)/2 \quad (13)$$

The same operations as described above will be executed with respect to Vc1. Specifically, a comparator 20b compares Vc1 with the center voltage Vc10 (initial calculation, Vc10 is set for a predetermined initial value) to generate a signal so that if $Vc1 > Vc10$, a switch circuit 21b is connected with a hold circuit 22c, and if $Vs1 < Vs10$, it is connected with a hold circuit 22d. On the other hand, when Vs1 becomes substantially equal to Vs10, i.e.

$$Vs10 - \Delta V \leq Vs1 \leq Vs10 + \Delta V \quad (14)$$

($\Delta V$: an identifying voltage), a hold signal generating circuit 23b generates a signal so that the hold circuit 22c and 22d are placed into a hold state. Thus, the maximum value Vc1max of Vc1 is held in the hold circuit 22c, and the minimum value Vs1min of Vs1 is held in the hold circuit 22d. Therefore, using an adder 24b, amplifiers 25c, 25d and a subtractor 26b, the center voltage Vc10 and the amplitude voltage Vc1h of Vc1 can be calculated by $$Vc10 = (Vc1max + Vc1min)/2 \quad (15)$$

$$Vc1h = (Vc1max - Vc1min)/2 \quad (16)$$

Further, the center voltages Vs20 and Vc20, and the amplitude voltages Vs2h and Vc2h of the sine wave signals Vs2 and Vc2 can be obtained by a center/amplitude voltage detecting circuit 14b in the same manner as described above.

Figure 3A:
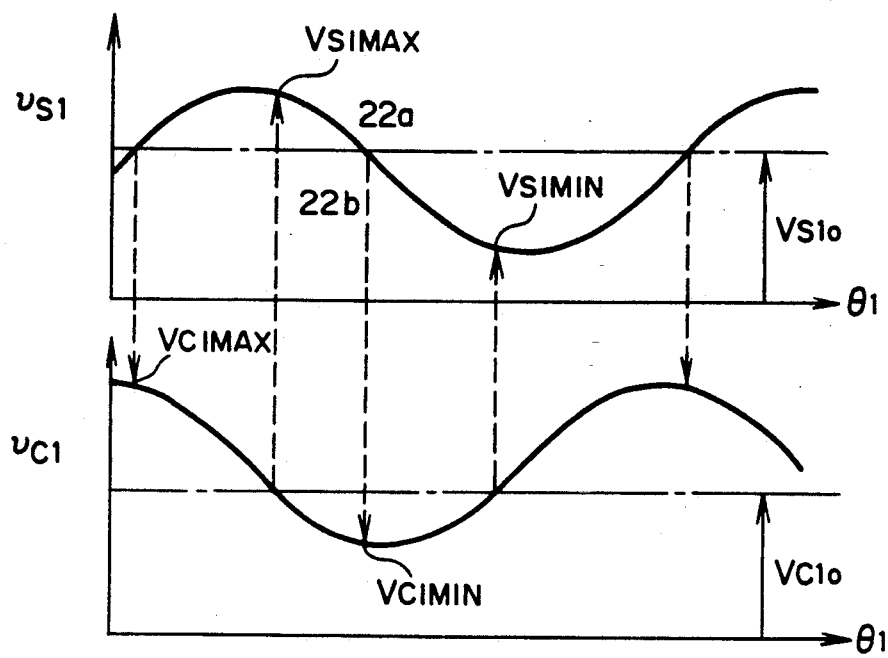
FIGS. 3A and 3B are characteristic graphs of a sine wave signal for identifying the maximum value and minimum value of an angular signal.
Figure 3B:
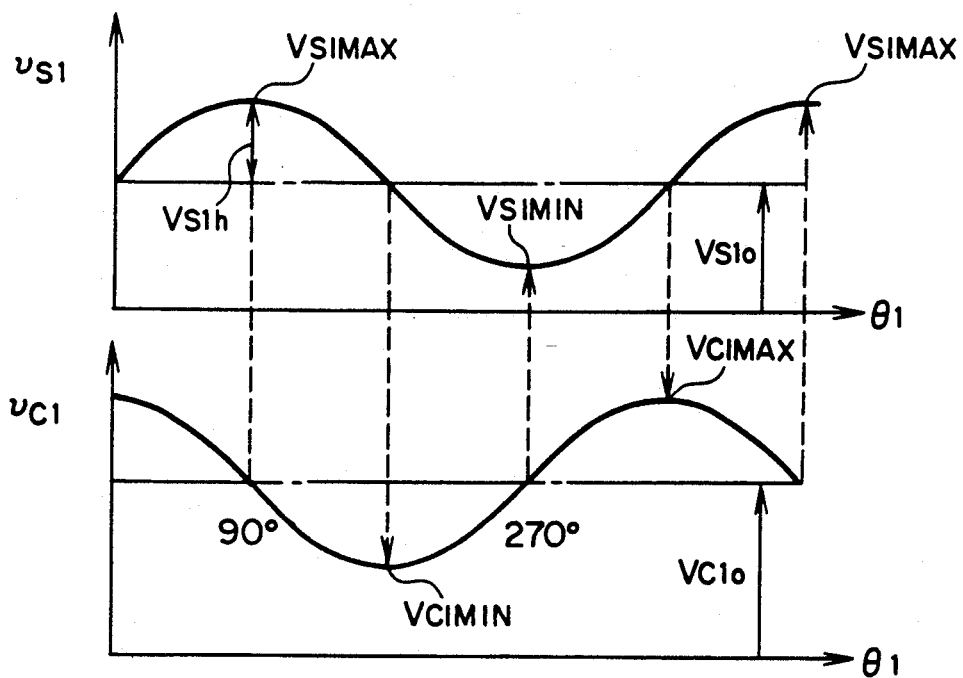

FIGS. 3A and 3B are graphs for explaining the process of identifying the maximum values Vs1max and Vc1max and the minimum values Vs1mini and Vc1mini in accordance with the method described in connection with FIG. 2. In FIGS. 3A and 3B, the abscissa represents the steering wheel side angle $\theta 1$, and the ordinate represents the corresponding sine wave signals Vs1 and Vc1. FIG. 3A shows the state where the real center voltage of Vs1 is lower than the predetermined initial value thereof whereas that of Vc1 is higher than the predetermined initial value thereof. As seen from FIG. 3A, the detected maximum values Vs1max, Vc1max and the detected minimum values Vs1min, Vc1min are different from the corresponding real maximum and minimum values. With respect to the amplitude voltages Vs1h, Vc1h and the center voltages Vs10, Vc10 calculated using these maximum values and minimum values, the amplitude voltages are smaller than the corresponding real values whereas the center voltages are substantially equal to the corresponding real values. Then, using the center voltages Vs10 and Vc10, the maximum values Vs1max, Vc1max and the minimum values Vs1min, Vc1min are detected again. As seen from FIG. 3B, these maximum and minimum values are substantially equal to the corresponding real values.

Therefore, changes in the center voltages and the amplitude voltages, which may occur owing to the change in the sensor characteristic and the torque exerted on the steering shaft, can be automatically detected so that the torque can be detected with high accuracy. Especially in the electric power steering apparatus, the accuracy in the torque sensor directly influences the steering feeling of a driver. Adoption of the system as described above, therefore, permits the power steering apparatus to implement a steering wheel operation with constant wheel force, but without need for an adjustment circuit, and this will provide a good steering feeling.

Figure 4:
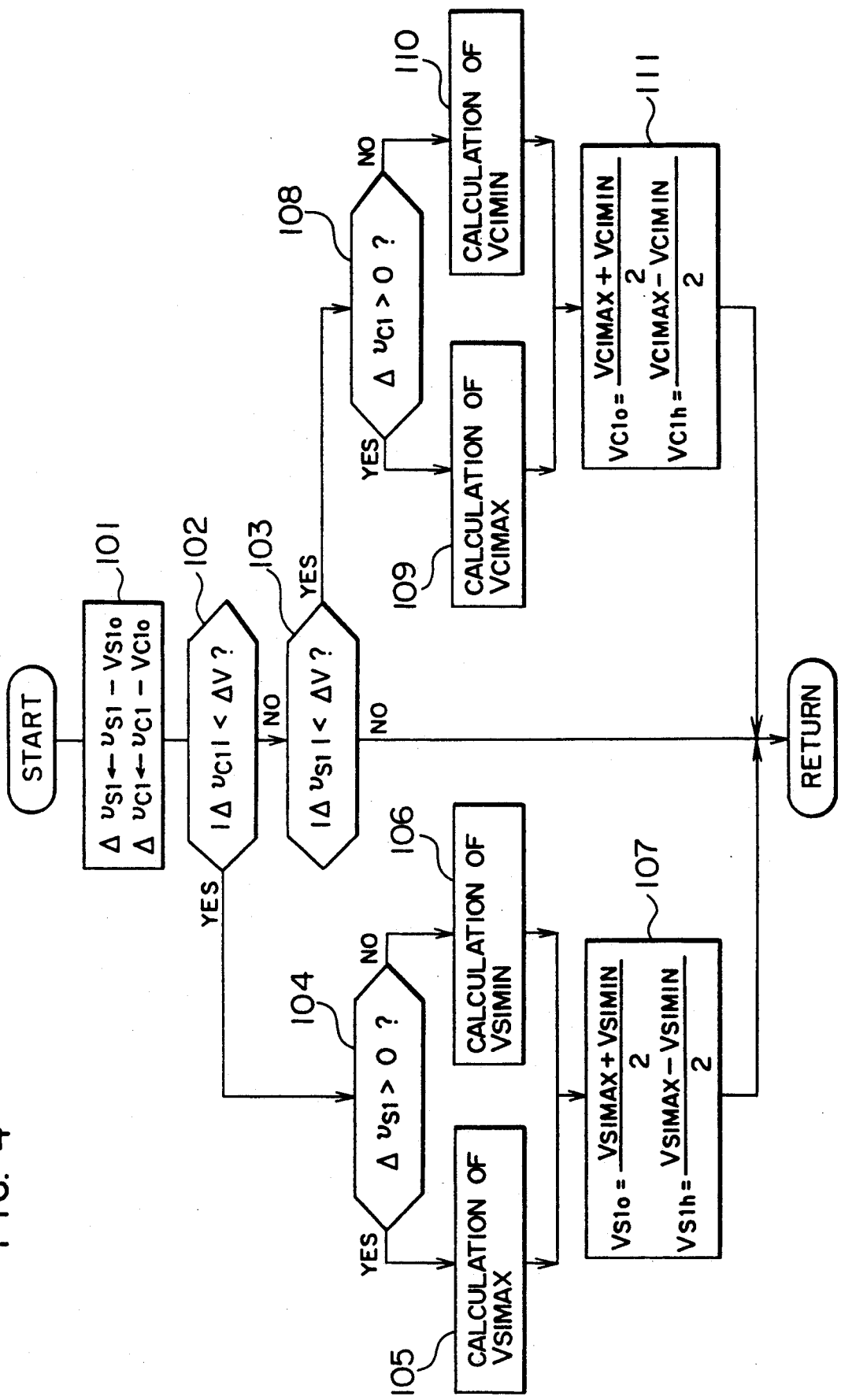
FIG. 4 is a flowchart of an example when the center/amplitude detecting circuit is executed by software of a microcomputer.

FIG. 4 shows an example of the process of the software processings in a microcomputer which can be used in place of the center/amplitude detecting circuit 14. Although only the processings corresponding to the center/amplitude detecting circuit 14a are shown, the same processings will be executed on the center/amplitude detecting circuit 14b.

First, calculated in step 101 are voltage differences $\Delta Vs1$, $\Delta Vc1$ between Vs1, Vc1 and the center voltages Vs10, Vc10 now being provided. In step 102, the absolute value $|\Delta Vc1|$ of the voltage difference is compared with the identifying voltage $\Delta V$. If $|\Delta Vc1|$ is larger than $\Delta V$, the process goes to step 103, and if $|\Delta Vc1|$ is smaller than $\Delta V$, the process goes to step 104.

In step 104, whether the voltage difference $\Delta Vs1$ is positive or negative is decided. If $\Delta Vs1 > 0$, in step 105, Vs1max is calculated. If $\Delta Vs1 < 0$, in step 106, Vs1min is calculated. In this case, Vs1max and Vc1min can be calculated by $$Vs1max = \{(N-1)Vs1max + Vs1\}/N \quad (17)$$

$$Vs1min = \{(N-1)Vs1min + Vs1\}/N \quad (18)$$

where N: weighting constant (integer) Thereafter, in step 107, the center voltage Vs10 and the amplitude voltage Vs1h are calculated using Equations (12) and (13).

On the other hand, when the process goes to step 104, in this step, the absolute value $|\Delta Vs1|$ of the voltage difference is compared with the identifying voltage $\Delta V$. If $|\Delta Vs1| > \Delta V$, the process is terminated because this case is not to be detected. If $|\Delta Vs1| < 0$, the process goes to step 108. In step 108, whether the voltage difference $\Delta Vc1$ is positive or negative is decided. If $\Delta Vc1 > 0$, in step 109, Vc1max is calculated. If $\Delta Vc1 < 0$, in step 110, Vs1min is calculated. In this case, Vc1max and Vc1min can be calculated by $$Vc1max = \{(N-1)Vc1max + Vc1\}/N \quad (19)$$

$$Vc1min = \{(N-1)Vc1min + Vc1\}/N \quad (20)$$

where N: weighting constant (integer) Thereafter, in step 111, the center voltage Vc10 and the amplitude voltage Vc1h are calculated using Equations (15) and (16).

In accordance with this example, the speed of identifying the center voltages and amplitude voltages (convergence period therefor) can be optionally varied by the processing of using a weighting constant so that a stabilized sensor free from the influence of instantaneous noise having a period shorter than the convergence period can be provided.

Figure 5:
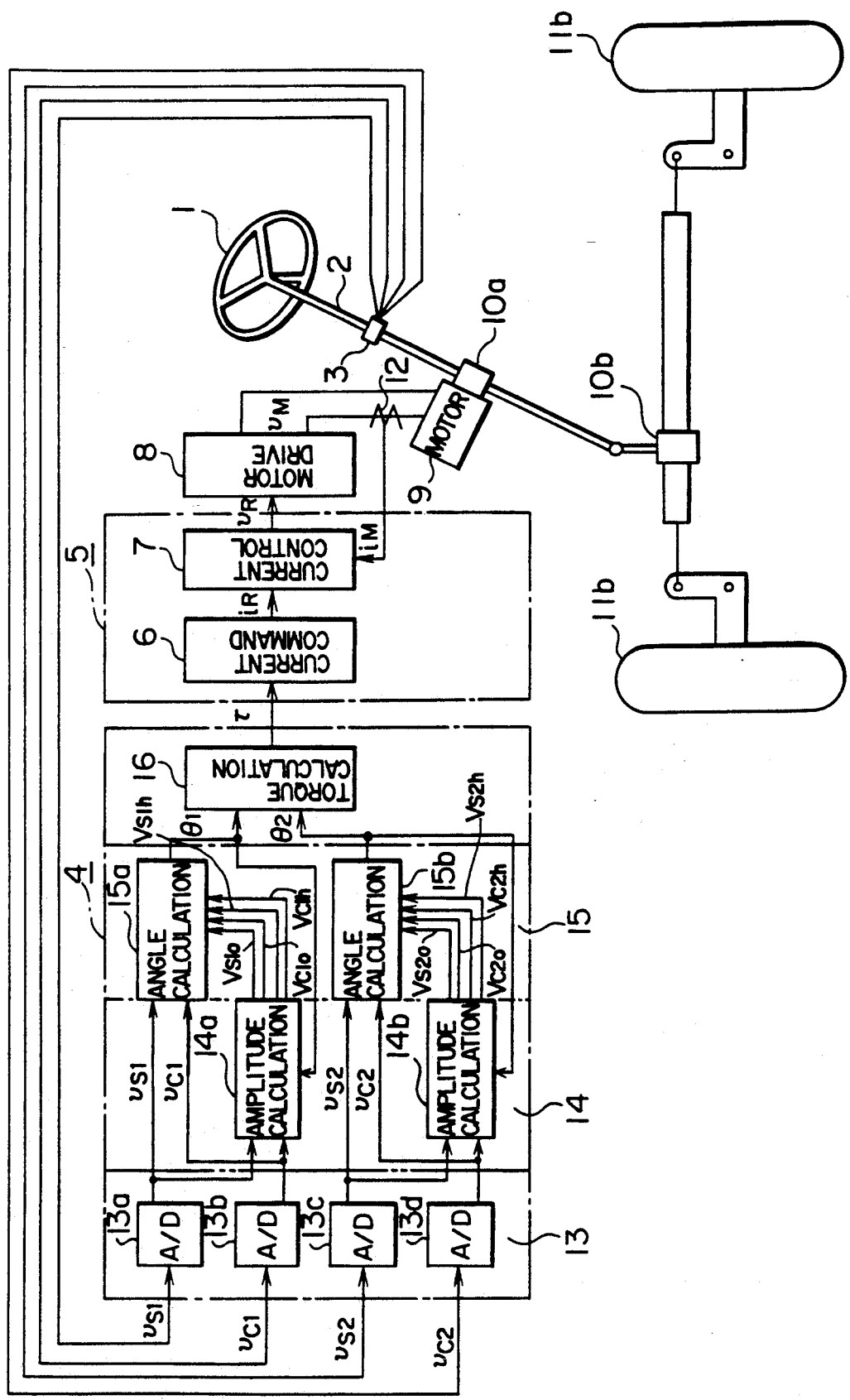
FIG. 5 is a view showing the arrangement of the other embodiment of the rotation angle/torque detecting device according to the present invention which is different from the embodiment of FIG. 1 in that a steering wheel side angle and a mechanism side angle are fed back to the center detecting circuit.
Figure 6:
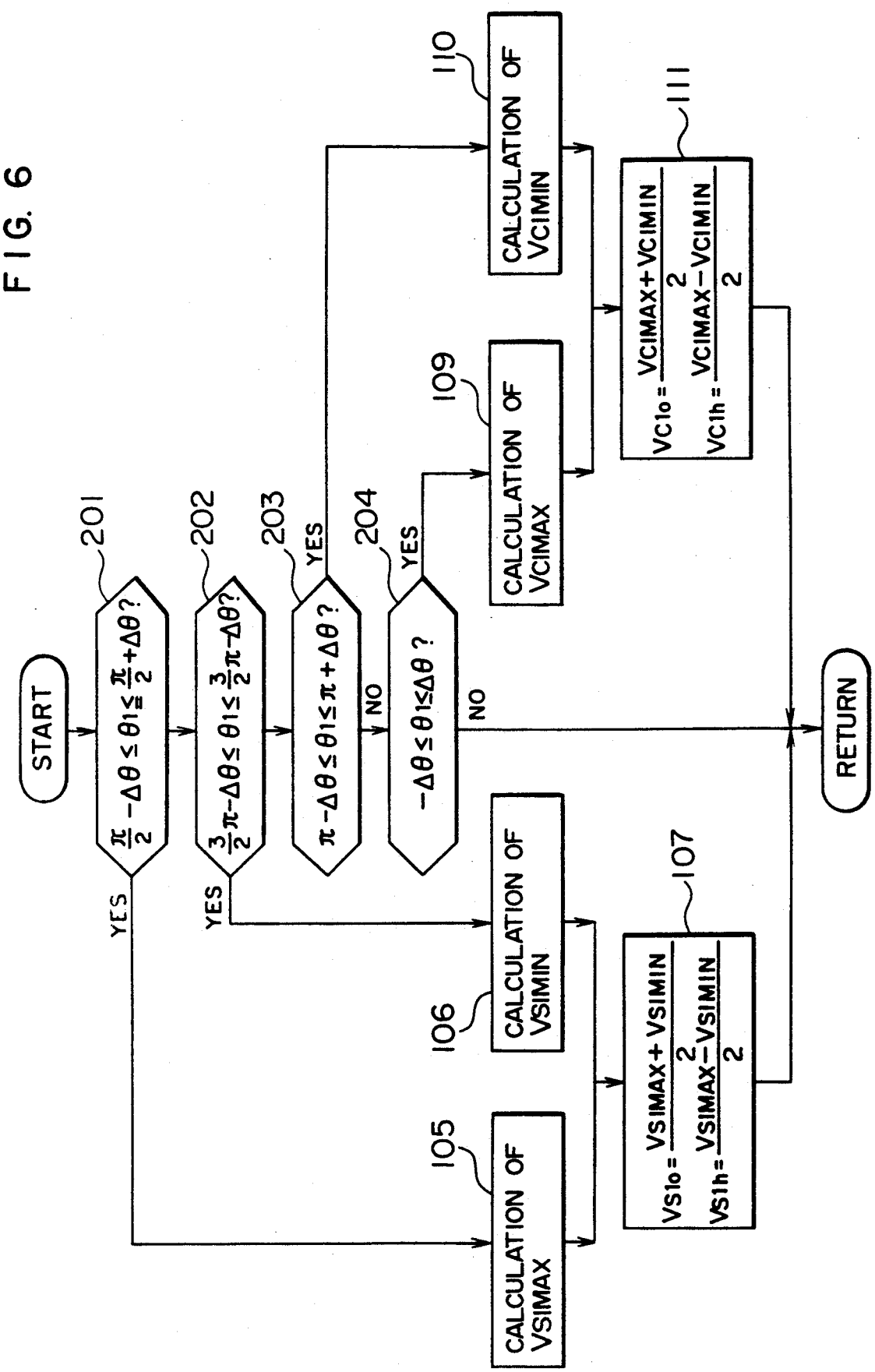
FIG. 6 is a flow chart showing the operation of the center/amplitude detecting circuit in FIG. 5.

FIG. 5 is a modification of the first embodiment of the present invention shown in FIG. 1, in which another mechanism is added to feed back the steering wheel side angle $\theta 1$ and motor side angle $\theta 2$ calculated by the angle calculating circuit 15 to the center/amplitude detecting circuit 14. The system of FIG. 5 operates in the same manner as that of FIG. 1 except that the mechanism is added. The operation of the center/amplitude detecting circuit 14 to which $\theta 1$ and $\theta 2$ are fed back is shown in FIG. 6. More specifically, FIG. 6, corresponding to FIG. 4, shows the center/amplitude detecting circuit 14a which is to be executed in the software processings by a microcomputer. The process shown in FIG. 6 is different than FIG. 4 in steps 201 to 204, but FIG. 6 is the same in steps 109 to 111 as that of FIG. 4. First, in step 201, whether or not the steering wheel side angle $\theta 1$ is within $90° \pm \Delta\theta(\Delta\theta$: identifying angle) is decided. If the answer is "yes", in step 105, Vs1max is calculated. If it is "no", the process goes to step 202. In this step, whether or not the steering wheel side angle is within $270° \pm \Delta\theta$ is decided. If the answer is "yes", in step 106, Vs1min is calculated. If it is "no", the process goes to step 203. In this step, whether or the steering wheel side angle $\theta_1$ is within $180° \pm \Delta\theta$ is decided. If the answer is "yes", the process goes to step 110 where Vc1min is calculated. If it is "no", the process goes to step 204. In this step, whether or not the steering wheel side angle $\theta_1$ is within $\pm\Delta\theta$ is decided. If the answer is "yes", the process goes to step 109 where Vc1max is calculated. If the steering wheel side angle $\theta_1$ does not meet any of the above conditions, the identifying processing will not be executed. In accordance with the identifying process described above, the identifying angle $\Delta\theta$ means a permissible angle error so that the torque sensor can be designed with high accuracy.

Figure 7:
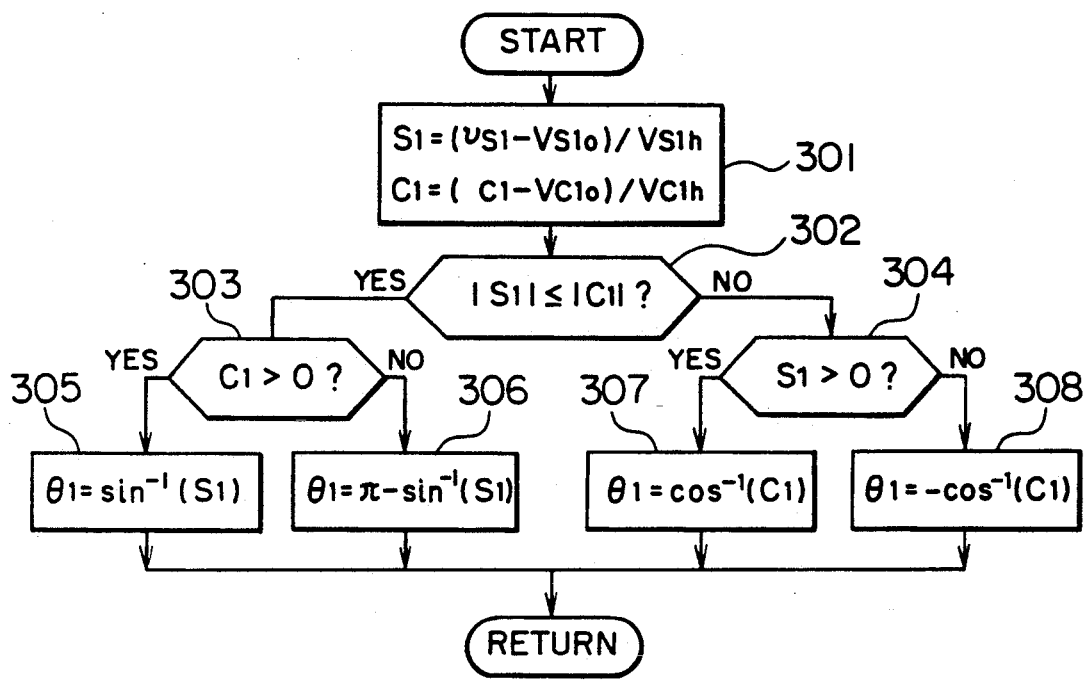
FIG. 7 is a flow chart of the calculating method in the angle calculating circuit in the other embodiment.

Referring to FIG. 7, explanation will be given on a process different from the calculating method in the angle calculating circuit 15 explained in connection with FIG. 1. Specifically, FIG. 7 shows the software processings in 15a of the angle calculating circuits designed in the microcomputer. In step 301, Equations (5) and (6) are calculated to provide the sine value s1 and the cosine value c1. In step 302, the absolute values thereof are compared with each other. If $|s1| \leq |c1|$, the process goes to step 303, while if $|s1| > |c1|$, the process goes to step 304.

When the process goes to step 303, in this step, whether c1 is positive or negative is decided. If $c1 > 0$, the process goes to step 305, and in the other case it goes to step 306. If the process has gone to step 305, this means that the $\cos\theta_1 > 1$ and the $|\sin\theta_1| \leq |\cos\theta_1|$, so that the steering wheel angle $\theta_1$ is in the range of $-45°$ to $+45°$. Therefore, in step 305, the steering wheel side angle $\theta_1$ is calculated by $$\theta_1 = \sin^{-1}(s1) \tag{21}$$

Likewise, the process goes to step 306 when the steering wheel side is in the range of 135° to 225°. Therefore, in step 306, the steering wheel side angle $\theta_1$ is calculated by $$\theta_1 = \pi - \sin^{-1}(s1) \tag{22}$$

When the process goes to step 304, in this step, whether s1 is positive or negative is decided. If $s1 > 0$, the process goes to step 307, and in the other case, it goes to step 308. That the process has gone to step 305 means $\sin\theta_1 > 0$ and $|\sin\theta_1| > |\cos\theta_1|$, so that the steering wheel angle $\theta_1$ is in the range of 45° to 135°. Therefore, in step 307, the steering wheel side angle $\theta_1$ is calculated by $$\theta_1 = \cos^{-1}(s1) \tag{23}$$

Likewise, the process goes to step 308 when the steering wheel side is in the range of $-135°$ to 45°. Therefore, in step 308, the steering wheel side angle $\theta_1$ is calculated by $$\theta_1 = -\cos^{-1}(c1) \tag{24}$$

In accordance with this example, $\theta_1$ can be calculated through division the number of which is less than the case by using Equation (7) ($\theta_1 = -\tan^{-1}(s1/c1)$), thereby executing the calculation at a higher speed.

Meanwhile, as both $\sin\theta_1$ and $\cos\theta_1$ approaches 1, their changing rate for the steering wheel side angle $\theta_1$ becomes small, so that the accuracy in $\sin^{-1}(s1)$ or $\cos^{-1}(c1)$ will be decreased. In this example, $\sin^{-1}(s1)$ or $\cos^{-1}(c1)$ is adopted to always provide a higher accuracy in the four divided ranges so that the torque can be detected with a high accuracy.

Figure 8:
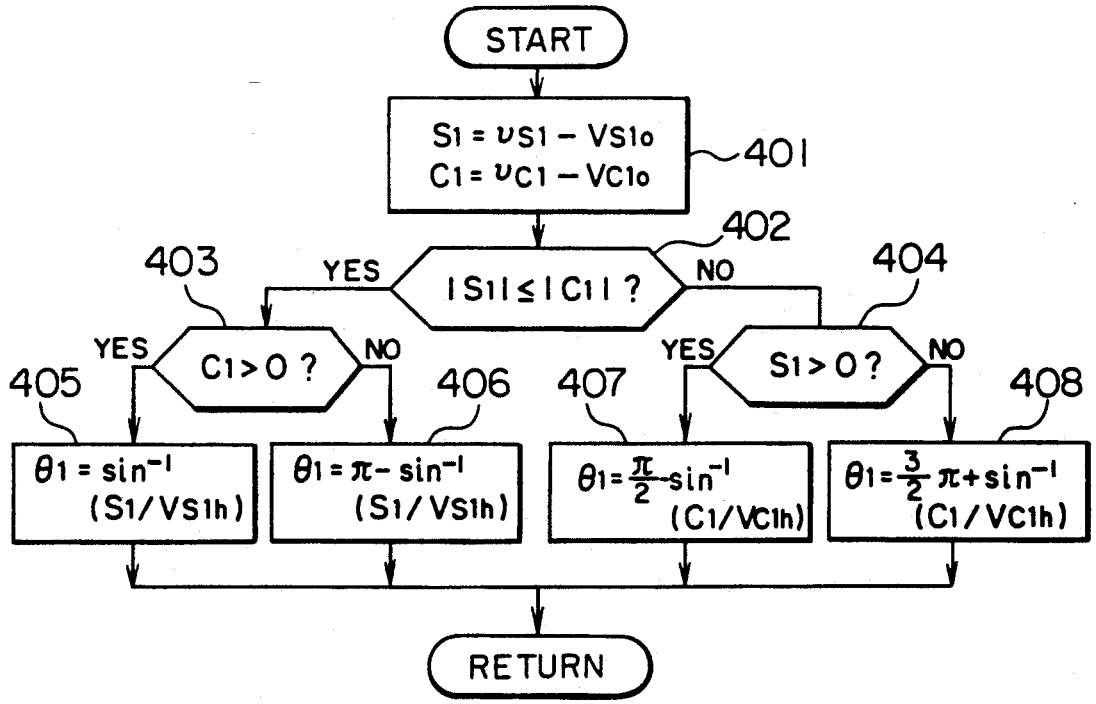
FIG. 8 is a flow chart of the calculating method on the angle calculating circuit of a still other embodiment.

FIG. 8 show a modification of the angle detecting method of FIG. 7. The basic idea in FIG. 8 is the same as that in FIG. 7. However, in step 401 in FIG. 8, without division, s1 and c1 are calculated as $$s1 = (Vs1 - Vs10) \tag{25}$$

$$c1 = (Vc1 - Vc10) \tag{26}$$

In steps 402 to 404, the same processings as in steps 302 to 304 in FIG. 7 are executed. Steps 405 to 408 correspond to steps 305 to 308 in FIG. 7; in steps 405 to 408, division with a divisor of Vs1h or Vc1h is executed. Thus, the number of divisions can be further reduced as compared with the case of FIG. 7. Additionally, range division in steps 405 to 408 depends on Vs1h and Vc1h so that the steering wheel side angle $\theta_1$ is not necessarily sectioned at $-45°$, 45°, 135°, and 225°. Further, in step 407, $\pi/2 - \sin^{-1}(c1/Vc1h)$ is calculated instead of $\cos^{-1}(c1/Vc1h)$, and in step 408, $3\pi/2 + \sin^{-1}(c1/Vc1h)$ is calculated instead of $\cos^{-1}(c1/Vc1h)$ (It should be noted that $-90°$ is considered to be equal to 270°. In the method, with the calculation results for only arc sine functions previously stored in a ROM table, they are read through a table pick-up system. Therefore, in accordance with this method of FIG. 8, calculations can be made at a high speed, and also a system with less memory storage can be realized since arc cosine functions are not used. Accordingly, an electric power steering with a compact and inexpensive control device can be accomplished.

Figure 9:
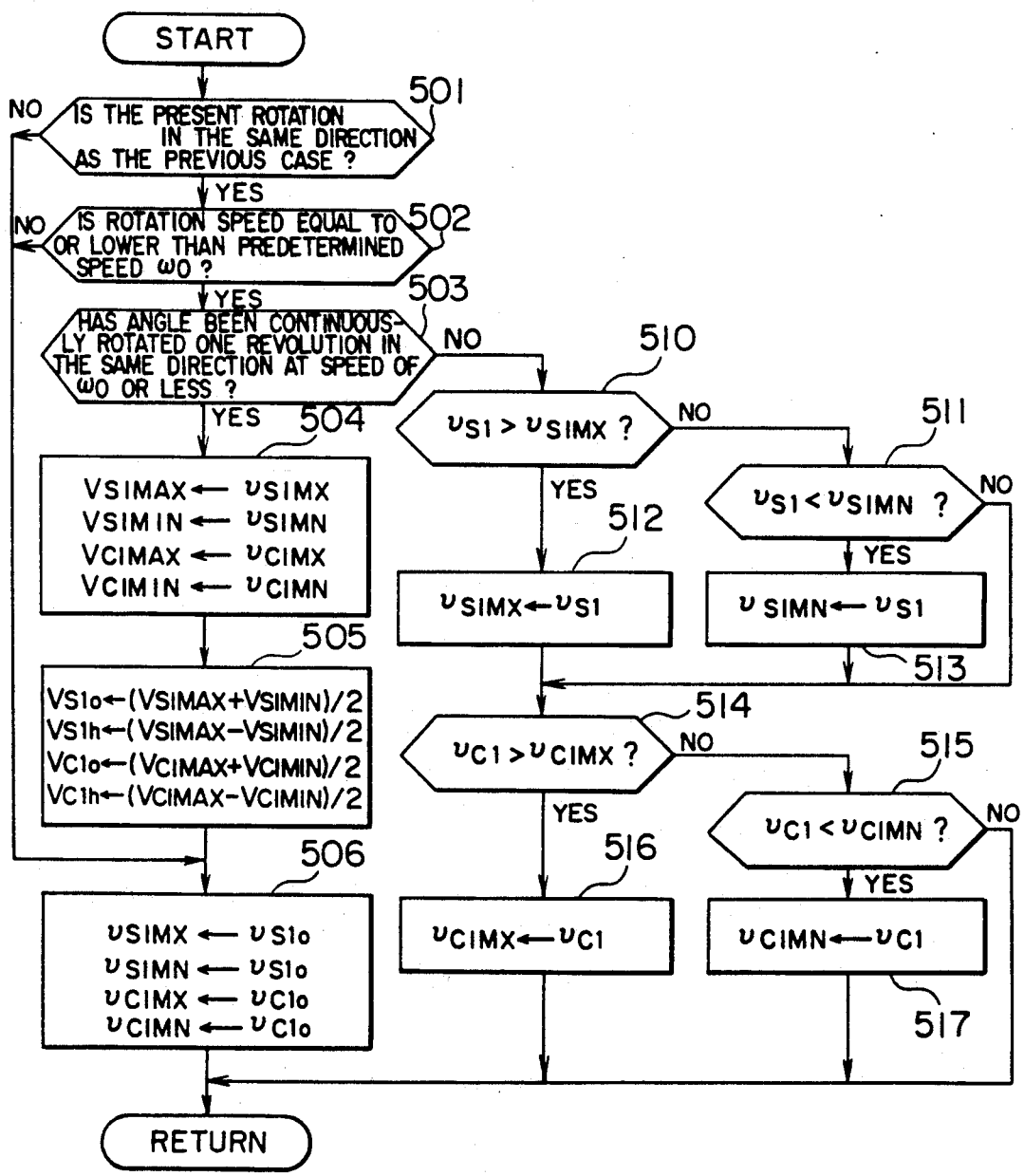
FIG. 9 is a flow chart for explaining the method for calculating the maximum value and minimum value of the angular signal in the other embodiment.

FIG. 9 is a flow chart of the software process which is different from the method of calculating the maximum value and minimum value of the sine wave signal. In step 501, if the steering wheel side angle $\theta_1$ rotates in the same direction as in the previous detection, this condition is detected. If it rotates in a different direction, the maximum and minimum values cannot be calculated by the method of FIG. 9. So the process goes to step 506. If the steering wheel side angle $\theta_1$ rotates in the same direction, in step 502, its rotating speed is decided. If it is equal to a predetermined speed $\omega_0$ or higher, the process goes to step 506. This is because if the rotating speed is too high, the maximum value or minimum value may not be sampled. On the other hand, if the rotating speed is lower than the predetermined speed $\omega_0$, the process goes to step 503. In this step, the decision is made on if the steering wheel side angle $\theta_1$ has continuously rotated in the same direction up to 360° (electric angle) within the predetermined speed. If it has not rotated up to 360°, the process goes to step 510 et seq. First, in step 510, the present Vs1 is compared with the present Vs1max. If $Vs1 \leq Vs1max$, the process goes to step 511, and if $Vs1 > Vs1max$, it goes to step 512. In step 512, Vs1max is renewed to Vs1. In step 511, the present Vs1 is compared with Vs1min. If $Vs1 < Vs1$, in step 513, Vs1min is renewed to vs1. If $Vs1 < Vs1min$, the renewal operation is not performed. Likewise, Vc1max and Vc1min are also renewed in steps 514 to 517. If the steering wheel side angle $\theta_1$ has rotated up to 360° as a result of such a renewal, the process goes from step 503 to step 504. In step 504, the renewed Vs1max, Vs1min, Vc1max and Vc1min are taken as Vs1max, Vs1min, Vc1max and Vc1min, respectively. In step 505, Equations (12), (13), (14) and (15) are calculated. Thus, the respective center voltage and amplitude voltages of Vs1 and Vc1 can be obtained. In step 506, Vs1max and Vs1min are initialized to Vs10, and Vc1max and Vc1min are initialized to Vc10. In this example, there is no transient state to identify the center voltages and the amplitude voltages so that the torque sensor can be operated with high accuracy from when the steering wheel starts to rotate in response to power supply. Thus, an electric power steering apparatus can be operated to provide good steering feeling from an initial state.

Figure 10:
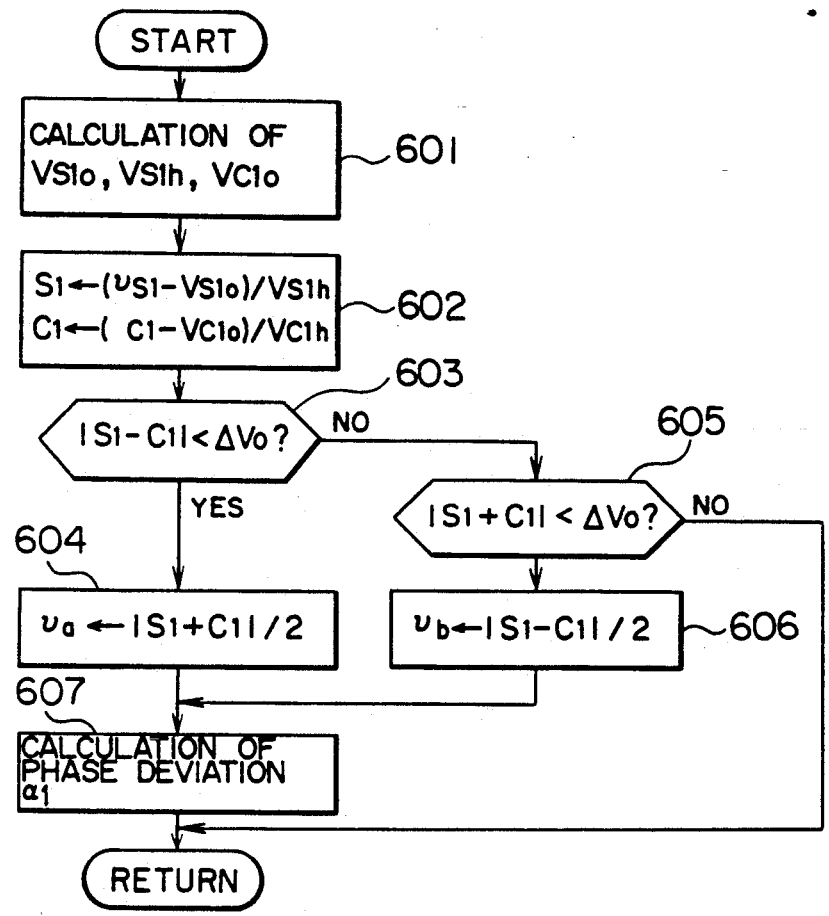
FIG. 10 is a flow chart of detecting the phase deviation in the sine wave signal.

FIG. 10 shows a flowchart of the software process for correction when phase difference in sine wave signals vary from 90°. Generally, the phase differences in the sine wave signals can vary from 90° owing to error in attaching a torque sensor. An exploration will be given for the principle of detecting the phase deviation $\alpha 1$ by which the phase difference between Vs1 and Vc1 varies. Then, Vs1 and Vc1 can be written by $$Vs1 = Vs1h \sin \theta 1 + Vs10 \tag{27}$$

$$Vc1 = Vc1h \cos (\theta 1 + \alpha 1) + Vc10 \tag{28}$$

From Equations (27) and (28), $\sin \theta 1$ and $\cos (\theta 1' \alpha 1)$ can be expressed by $$s1 = \sin \theta 1 = (Vs1 - Vs10)/Vs1h \tag{29}$$

$$c1 = \cos (\theta 1 + \alpha 1) = (Vc1 - Vc10)/Vc1h \tag{30}$$

Now it is assumed that the absolute value of s1 and c1 when s1=c1 in Equations (29) and (30) is Va, and that of them when s1=−c1 is Vb. From Equations (29) and (30), the relationship between the phase deviation $\alpha 1$ and the absolute values Va, Bv can be expressed by $$(1 + \sin \alpha 1)/\cos \alpha 1 = Vb/Va \tag{31}$$

Therefore, by detecting Va and Vb, the phase deviation $\alpha 1$ can be calculated uniquely from Equation (31). If the phase deviation $\alpha 1$ is zero, Vb/Va is 1.

Referring to FIG. 10, a concrete method of calculating the phase deviation will be explained below.

In step 601, the center voltages Vs10, Vc10 and the amplitude voltages are calculated by the methods described in connection with FIGS. 2 and 9. Even if there is a phase deviation $\alpha 1$, it does not influence these methods. Particularly, the method of FIG. 9 is not influenced by $\alpha 1$. In step 602, the sine value s1 and the cosine value c1 are calculated from Equations (29) and (30). If in step 603, the difference between s1 and c1 is decided to be within $\Delta V0$, in step 604, ½ of the absolute value of (s1+c1) is Va. If the above difference exceeds $\Delta V0$, the process goes to step 605. In step 605, if the difference between s1 and −c1 is within $\Delta V0$ is decided. If the answer is "yes", the process goes to step 606, and if it is "no", $\alpha 1$ will not be calculated. In step 606, ½ of the absolute value of (s1−c1) is taken as Vb. In step 607, using va and Vb calculated in steps 604 and 605, respectively, the phase deviation $\alpha 1$ is calculated to meet Equation (31).

Figure 11:
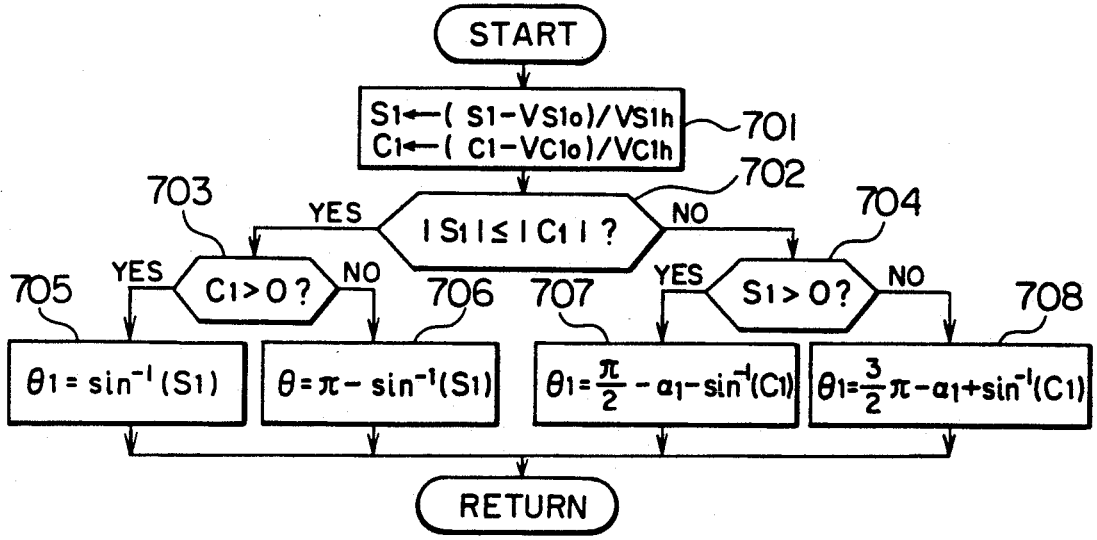
FIG. 11 is a flow chart of the angle calculating method for compensating for the phase deviation detected in the flowchart of FIG. 10.

FIG. 11 is a flowchart of software in the angle calculation circuit 15 in which the phase deviation $\alpha 1$ is considered. Steps 701 to 704 are the same as steps 301 to 304 in FIG. 7. Steps 705 to 706 are the same as steps 305 to 306 in FIG. 7 because $\sin \theta 1$ is taken as a phase standard. Therefore, in steps 707 and 708, subtraction of the phase deviation $\alpha 1$ provides the steering wheel side angle $\theta 1$.

Figure 12A:
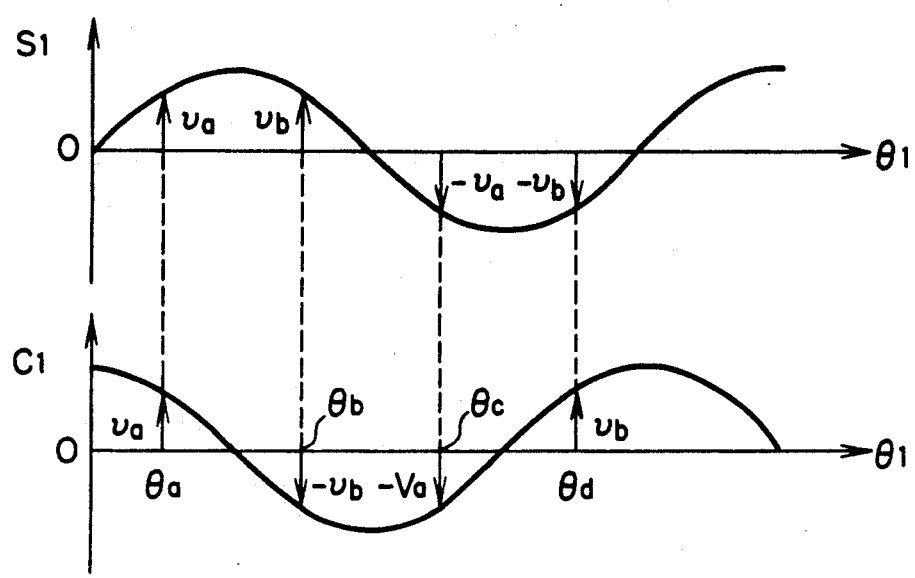
FIGS. 12A and 12B are characteristic graphs of the sine wave signal for explaining the theory of detecting the phase deviation.
Figure 12B:
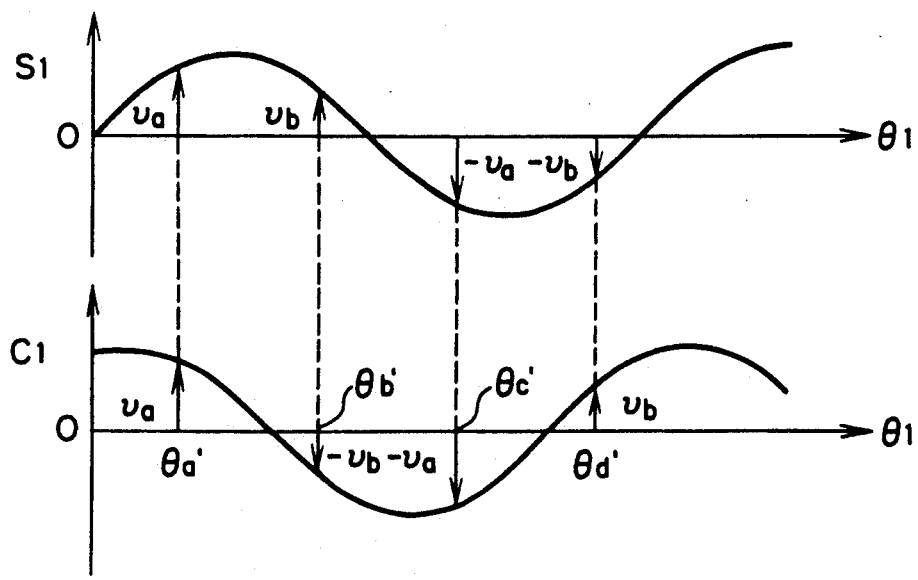

Further, FIGS. 12A and 12B are waveform charts showing the relationships between the phase deviation $\alpha 1$ and Va, Vb. FIG. 12A shows the magnitudes of Va and Vb when the phase deviation $\alpha 1 = 0$. As seen, Va=Vb. FIG. 12B shows the magnitudes of Va and Vb when the phase deviation $\alpha 1 = -30°$. Since Va>Vb, the phase deviation $\alpha 1$ has a negative value as understood from Equation (31). The detection of the phase deviation $\alpha 1$ shown in FIGS. 10 and 11 is represented by block 29 in FIG. 2.

Figure 13:
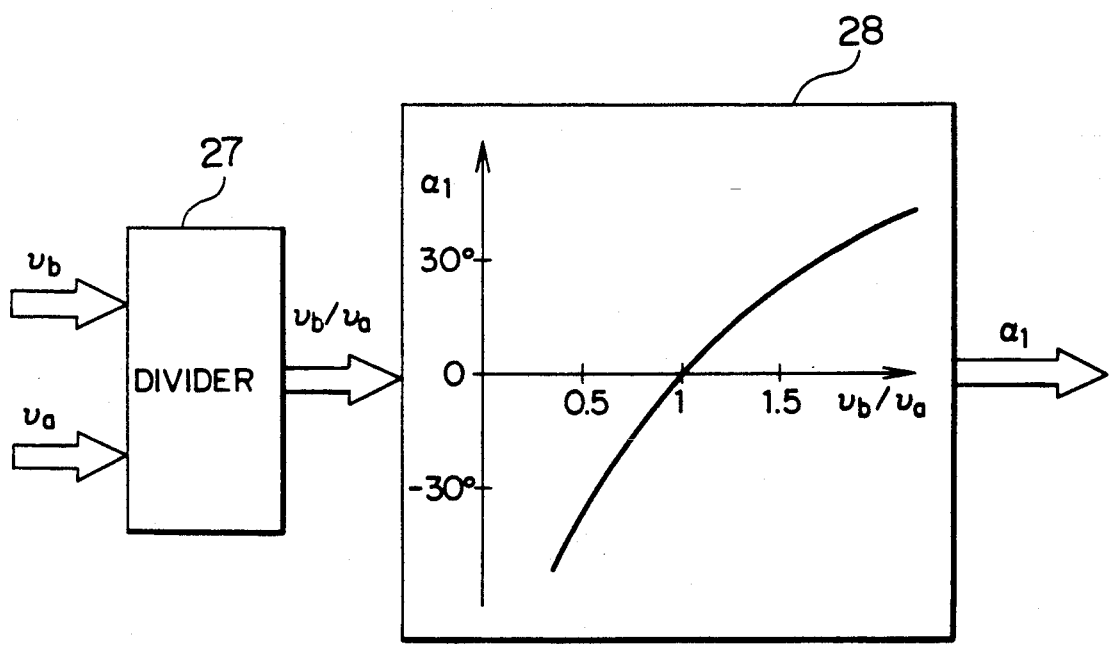
FIG. 13 is a view showing the hardware corresponding to the method for detecting the phase deviation.

FIG. 13 is a view for explaining a method of calculating the phase deviation $\alpha 1$ on the basis of Va and Vb. A divider 27 calculates Vb/Va in response to the input of Va and Vb. The value of Vb/Va is supplied to a read-only-memory (ROM) 28. More specifically, the value of Vb/Va is input to the address bus of the ROM 28. It is assumed that ROM 28 stores data of the phase deviation $\alpha 1$ given by Equation (31) at the address of the value of Va/Vb. Then, when the value of Vb/Va is input to the address bus of the ROM 28, data of the corresponding phase deviation is output to the data bus thereof. By means of this method, the phase deviation $\alpha 1$ can be calculated without executing any complicated calculation. Thus, in accordance with the present invention, the phase deviation as well as the center voltage and amplitude voltage is compensated for so that the torque control can be executed with high accuracy. Further, the phase deviation can be obtained only through calculation, i.e. by transforming Equation (31), instead of using the ROM table. So, if the capacity of ROM is to be reduced, the phase deviation can be obtained by only executing software for a microcomputer. Incidentally, with respect to the motor side angle $\theta 2$, the same processings as described above has only to be performed and so the details thereof will not be explained here.

It should be understood the torque sensor one embodiment of the present invention hitherto explained can be applied to a device other than the power steering apparatus, and also used as a position sensor. For example, the torque sensor can be used for robot control. Specifically, if, in order to detect the torques of the motors for respective shafts of a robot, the torque sensor is arranged on each of the shafts directly connected with the motors, the torques output by the motors can be easily detected, thereby permits the force by the robot to be easily controlled. Thus, the torque sensor in accordance with the present invention can be used for control of grasping a soft object such as a tofu by a man's hand. Further, it can be used to detect a pulsating torque at a high speed in an apparatus using a compressor such as a refrigerator, thereby executing high speed torque control and so realizing silent motor speed control with less number of rotations.

Further, although the torque sensor was constructed in a digital circuit in the above embodiment, it may also be constructed in an analog circuit. The present invention can be implemented by executing software relative to the torque calculation device and the torque control device designed in a one-chip microcomputer. The torque sensor according to the present invention may be either an optical sensor or a magnetic sensor.

In accordance with the present invention, in a non-contact rotating angle/rotating torque sensor using wave signals, possible signal variation can automatically detect signal variation, thereby providing the rotating angle/rotating sensor with high accuracy. The electric power steering apparatus using such a rotating angle/-rotating torque sensor requires no signal adjustment circuit, and so can provide good steering feeling with no adjustment and at low cost.

We claim:

1. A device for detecting the rotating angle of a rotary shaft comprising:

signal generating means for generating two signals which vary in amplitude in accordance with the rotating angle of said rotary shaft and have a predetermined phase difference therebetween;

means for detecting levels of the center voltages and the amplitudes of said two signals from said signal generating means;

means for correcting the detected level of the center voltage and the detected amplitude of each of said two signals using the detected level of the center voltage of the other of said two signals; and means for calculating the rotating angle of said rotary shaft using said corrected center voltages and amplitudes of said two signals.

2. A device according to claim 1, wherein said signal generating means simultaneously generates first and second signals, said first signal having an amplitude which varies in a sine wave form with variation of said rotation angle, and the second signal having a sine waveform and a phase difference of 90° from said first signal;

said center voltage detecting means including means for determining the center voltage of each of the first signal and the second signal using the maximum value and the minimum value of the detected amplitude of each of said first signal and said second signal; and said center voltage correcting means including means for correcting values of the center voltage of each of said first and second of the signals by correcting the maximum and minimum values of the amplitudes thereof in response to previously determined values of said center voltage of the other of said first and second signals as determined by said center voltage detecting means.

3. A device for detecting the rotating angle of a rotary shaft comprising:

signal generating means for generating two signals which vary in amplitude in accordance with the rotating angle of said rotary shaft and have a variation from a predetermined phase difference therebetween;

means for detecting when said two signals output from said signal generating means have substantially equal amplitude values;

means for correcting the variation from the predetermined phase difference between said two signals output from said signal generating means using the values of said two signals at the times said two signals have substantially equal amplitude values; and means for calculating the rotating angle of said rotary shaft on the basis of the corrected two signals.

4. A device for detecting the rotating angle of a rotary shaft comprising:

signal generating means for generating two signals which vary in amplitude in accordance with the rotating angle of said rotary shaft and have a predetermined phase difference therebetween;

means for detecting when said two signals output from said signal generating means have substantially equal amplitude values;

means for correcting the respective center voltages of each of said two signals output from said signal generating means using a characteristic of the other of said two signals; and means for correcting a variation from the phase difference between said two signals output from said signal generating means using the values of said two signals at the times said two signals have substantially equal amplitude values;

means for calculating the rotating angle of said rotary shaft using the corrected two signals.

5. A rotating angle detecting device according to claims 3 or 4, further including:

means for detecting the level of the center voltages and the amplitudes of said two signals from said signal generating means;

means for correcting the detected level of the center voltage and the detected amplitude of each of said two signals; and means for calculating the rotating angle of said rotary shaft using said corrected center voltages and amplitudes of said two signals;

wherein said signal generating means simultaneously generates a first signal having an amplitude which varies in a sine wave form with variation of said rotation angle, and the second signal which has a sine wave form and a phase difference of 90° from said first signal; and wherein said phase correcting means includes means for determining a deviation in the phase difference between said first and second signals by comparing the absolute value of the amplitude of said first and second signals when the amplitudes of said first signal and said second signal are equal to each other and have the same polarity with the absolute value of the amplitude of said first and second signals when said amplitudes are equal to each other but have opposite polarities.

6. A device for determining rotating torque according to the rotating angle at spaced points on a rotary shaft, comprising:

first and second rotating angle detecting devices arranged at two different points on said rotating shaft, each of said first and second rotating angle detecting devices comprising signal generating means for generating two signals which vary in amplitude in accordance with the rotating angle of said rotary shaft and have a predetermined phase difference therebetween, center voltage detecting means for detecting levels of the center voltages of said two signals, means for correcting the level of center voltage of each of said two signals using the detected level of the center voltage of the other of said two signals, and means for calculating a rotating angle from said corrected two signals; and means for calculating the rotating torque of said rotary shaft according to a difference between two rotating angles calculated by said first and second rotating angle detecting means.

7. A device for determining rotating torque according to the rotating angle at spaced points on a rotary shaft, comprising:

first and second rotating angle detecting devices arranged at two different points on said rotary shaft, each of said first and second rotating angle detecting devices comprising signal generating means for generating two signals which vary in amplitude with the rotating angle of said rotary shaft and have a predetermined phase difference therebetween, center voltage detecting means for detecting the level of the center voltage of said two signals, means for correcting the level of the center voltages of each of said two signals output from said signal generating means using a detected level of the center voltage of the other of said two signals, means for detecting when said two signals have substantially equal amplitude values, means for correcting a deviation from said predetermined phase difference between said two signals output from said signal generating means using the values of said two signals at the times said two signals have substantially equal amplitude values, and means for calculating the rotating angles from said corrected two signals; and means for calculating the rotating torque of said rotary shaft according to a difference between two rotating angles calculated by said first and second rotating angle detecting means.

8. A rotating torque detecting device according to claims 6 or 7, wherein each signal generating means simultaneously generates a first signal having an amplitude which varies in a sine wave form with variation of said rotation angle, and a second signal which has a sine wave form and a phase difference of 90° from said first signal;

each center voltage detecting means determines the level of the center voltage of each of the first signal and the second signal according to the maximum value and the minimum value of the amplitude of said first signal and said second signal; and said center voltage correcting means includes means for correcting values of the center voltage of each of said first and second of the signals by correcting the maximum and minimum values of the amplitudes thereof in response to previously determined values of said center voltage of the other of said first and second signals as determined by said center voltage detecting means.

9. A device for determining rotating torque according to the rotating angle at spaced points on a rotary shaft, comprising:

first and second rotating angle detecting devices arranged at two different points on said rotary shaft, each of said first and second rotating angle detecting devices comprising signal generating means for generating two signals which vary in amplitude in accordance with the rotating angle of said rotary shaft and have a predetermined phase difference therebetween, means for detecting when said two signals have substantially equal amplitude values, means for correcting a deviation from said predetermined phase difference between said two signals output from said signal generating means using the values of said two signals at the times said two signals have substantially equal amplitude values; means for calculating the rotating angles from said corrected two signals; and means for calculating the rotating torque of said rotary shaft according to a difference between two rotating angles calculated by said first and second rotating angle detecting means.

10. A device according to claim 9, further including:
means for detecting the level of the center voltages and the amplitudes of said two signals from said signal generating means;

means for correcting the detected level of the center voltage and the detected amplitude of each of said two signals; and means for calculating the rotating angle of said rotary shaft using said corrected center voltages and amplitudes of said two signals;

wherein each signal generating means simultaneously generates a first signal having an amplitude which varies in a sine wave form with variation of said rotation angle, and the second signal which has a sine wave form and a phase-difference of 90° from said first signal; and wherein phase correcting means includes means for determining a deviation in the phase difference between said first and second signals by comparing the absolute value of the amplitude of said first and second signals when the amplitudes of said first signal and said second signal are equal to each other and have the same polarity with the absolute value of the amplitude of said first and second signals when said amplitudes are equal to each other but have opposite polarities.

11. An electric power steering apparatus wherein the rotating torque of a steering shaft is determined from the rotating angle at spaced points on the steering shaft and the output torque of an electric motor is controlled on the basis of the rotating torque, comprising:

an electric motor, mounted in said steering shaft, for generating a supplementary torque for driving the steering shaft;

first and second rotating angle detecting devices arranged at two different points between said electric motor in said steering shaft and a steering wheel, each of said first and second rotating angle detecting devices comprising signal generating means for generating two signals which vary in amplitude in accordance with the rotating angle of said rotating shaft and have a predetermined phase difference therebetween, center voltage detecting means for detecting levels of the center voltages of said two signals, means for correcting the level of center voltage of each of said two signals using the detected level of the center voltage of the other of said two signals, and means for calculating a rotating angle of said steering shaft from said corrected two signals; and means for calculating the steering torque of said steering shaft according to a difference between two rotating angles calculated by said first and second rotary angle detecting means; and means for controlling the output torque of said electric motor in accordance with the value of said steering torque.

12. An electric power steering apparatus wherein the rotating torque of a steering shaft is determined from the rotating angle at spaced points on the steering shaft and the output torque of an electric motor is controlled on the basis of the rotating torque, comprising:

an electric motor, mounted in said steering shaft, for generating a supplementary torque for driving the steering shaft;

first and second rotating angle detecting devices arranged at two different points between said electric motor in said steering shaft and a steering wheel, each of said first and second rotating angle detecting devices comprising signal generating means for generating two signals which vary in amplitude with the rotating angle of said steering shaft and have a predetermined phase difference therebetween, center voltage detecting means for detecting the level of the center voltage of said two signals, means for correcting the level of the center voltages of each of said two signals from said signal generating means using a detected level of the center voltage of the other of said two signals, means for detecting when said two signals have substantially equal amplitude values, phase correcting means for correcting a deviation of the phase difference between said two signals output from said signal generating means using the values of said two signals at the times said two signals have substantially equal amplitude values;

means for calculating the rotating angles of said steering shaft from said corrected two signals;

means for calculating the steering torque of said steering shaft according to a difference between two rotating angles calculated by said first and second rotating angle detection devices; and means for controlling the output torque of said electric motor in accordance with the value of said steering torque.

13. An electric power steering apparatus according to claims 11 or 12, wherein each signal generating means simultaneously generates a first signal having an amplitude which varies in a sine wave form with variation of said rotation angle, and a second signal which has a sine wave form and a phase difference of 90° from said first signal;

each center voltage detecting means determines the level of the center voltage of each of the first signal and the second signal according to the maximum value and the minimum value of the amplitude of said first signal and said second signal; and said center voltage correcting means includes means for correcting values of the center voltage of each of said first and second of the signals by correcting the maximum and minimum values of the amplitudes thereof in response to previously determined values of said center voltage of the other of said first and second signals as determined by said center voltage detecting means.

14. An electric power steering apparatus wherein the rotating torque of a steering shaft is determined from the rotating angle at spaced points on the steering shaft and the output torque of an electric motor is controlled on the basis of the rotating torque, comprising:

an electric motor, mounted in said steering shaft, for generating a supplementary torque for driving the steering shaft;

first and second rotating angle detecting devices arranged at two different points located between said electric motor in said steering shaft and a steering wheel, each of said first and second rotating angle detecting devices comprising signal generating means for generating two signals which vary in amplitude in accordance with the rotating angle of said steering shaft and have a predetermined phase difference therebetween, means for detecting when said two signals have substantially equal amplitude values, phase correcting means for correcting a deviation of the predetermined phase difference between said two signals output from said signal generating means using the values of said two signals at the times said two signals have substantially equal amplitude values;

means for calculating the rotating angles of said steering shaft from said corrected two signals;

means for calculating the steering torque of said steering shaft according to a difference between two rotating angles calculated by said first and second rotating angle detection devices; and means for controlling the output torque of said electric motor in accordance with the value of said steering torque.

15. An electric power steering apparatus according to claim 14, wherein said rotating angle detecting devices each further include:

means for detecting the level of the center voltages and the amplitudes of said two signals from said signal generating means;

means for correcting the detected level of the center voltage and the detected amplitude of each of said two signals; and means for calculating the rotating angle of said rotary shaft using said corrected center voltages and amplitudes of said two signals; and wherein each signal generating means simultaneously generates a first signal having an amplitude which varies in a sine wave form with variation of said rotation angle, and the second signal which has a sine wave form and a phase-difference of 90° from said first signal; and wherein said phase correcting means includes means for determining a deviation in the phase difference between said first and second signals by comparing the absolute value of the amplitude of said first and second signals when the amplitudes of said first signal and said second signal are equal to each other and have the same polarity with the absolute value of the amplitude of said first and second signals when said amplitudes are equal to each other but have opposite polarities.

16. A method of determining the rotating angle of a rotary shaft, comprising the steps of:

(a) generating first and second signals which vary in amplitude with the rotating angle of said rotating shaft so as to represent a sine wave with shaft rotation and which have a predetermined phase difference therebetween;

(b) storing values of the amplitude of said first signal as a maximum amplitude value and a minimum amplitude value at times in each cycle of said second signal when the amplitude of said second signal is equal to a value of the center voltage of said second signal determined from a maximum amplitude value and a minimum amplitude value of said second signal;

(c) determining, from the maximum amplitude value and the minimum amplitude value of said first signal stored during each cycle, the amplitude of said first signal with respect to its center voltage and the value of the center voltage of aid first signal; and calculating the rotating angle of the rotating shaft using the determined amplitude of said first signal with respect to its center voltage and the value of the center voltage thereof.

17. A method of detecting the rotary angle of a rotary shaft, according to claim 16, and further comprising the steps of:

(d) storing values of the amplitude of said second signal as a maximum amplitude value and a minimum amplitude value at times in each cycle of said first signal when the amplitude of said first signal is equal to the center voltage of said first signal as determined in step (c); and (e) determining, from the maximum amplitude value and the minimum amplitude value of said second signal stored during each cycle, the amplitude of said second signal with respect to its center voltage and the value of the center voltage of said second signal.

18. A method of detecting the rotating angle of a rotary shaft, according to claims 16 or 17, wherein the second signal differs in phase from said first signal by 90°, and further comprising the steps of:

(f) determining an amount of variation of the phase difference of said first and second signals by comparing detected positions of the absolute value of the amplitude of said first and second signals when the amplitudes thereof are equal and of the same polarity and the absolute value of the amplitude of said first and second signals when the amplitudes thereof are equal and of opposite polarity; and (g) correcting the variation of the phase difference using a result determined in step (f).

* * * * *